United States Patent [19]

Clayson

[11] Patent Number: 4,944,488
[45] Date of Patent: Jul. 31, 1990

[54] GATE VALVE

[75] Inventor: Peter D. Clayson, Edmonton, Canada

[73] Assignee: Alberta Ltd., Canada

[21] Appl. No.: 436,120

[22] Filed: Nov. 13, 1989

Related U.S. Application Data

[62] Division of Ser. No. 231,131, Aug. 11, 1988, abandoned.

[30] Foreign Application Priority Data

Nov. 26, 1987 [CA] Canada .................................. 552900

[51] Int. Cl.$^5$ .............................................. F16K 3/12
[52] U.S. Cl. ..................................... 251/203; 251/266
[58] Field of Search ............... 251/194, 203, 266, 267, 251/214, 329

[56] References Cited

U.S. PATENT DOCUMENTS

| | | | |
|---|---|---|---|
| 127,951 | 6/1872 | Beaumont | 251/203 |
| 571,880 | 11/1896 | Lunken | 251/203 X |
| 589,725 | 9/1897 | Hodge et al. | 251/214 |
| 1,020,449 | 3/1912 | Riggin | 251/203 |
| 1,451,473 | 4/1923 | Pulverman | 251/266 |
| 1,625,698 | 4/1927 | Barton | 251/266 X |
| 2,678,802 | 5/1954 | Adams | 251/328 |
| 2,787,439 | 4/1957 | Bredtschneider | 251/329 |
| 3,297,299 | 1/1967 | Anderson | 251/327 |
| 3,377,049 | 4/1968 | De Frees | 251/329 |
| 3,963,214 | 6/1976 | Hackman et al. | 251/329 |
| 4,223,868 | 9/1980 | Humes et al. | 251/326 |
| 4,434,967 | 3/1984 | Vanderburg | 251/328 |

FOREIGN PATENT DOCUMENTS 5278 of 1889 United Kingdom ................ 251/203

Primary Examiner—John C. Fox
Attorney, Agent, or Firm—Steele, Gould & Fried

[57] ABSTRACT

A high-pressure, high-temperature gate valve which uses a flat faced gate seating on a flat and preferably interchangeable seat, the gate having a wedge-shape on the upstream side which assists in forcing the seating surfaces together which is highly desirable in high-pressure conditions. The inlet and outlet ports are completely covered in the closed position which enables the valve to withstand extreme pressures. The gate valve further includes a valve stem extending through said chamber and said body having a threaded lower end cooperating with a threaded recess in said gate, said stem being axially rotatable in a bearing means in said body to raise and lower said gate between said open and closed positions, said bearing means including a stuffing box, a lower seat and an upper seat through which said stem extends, said stem including an integral collar located between said seats. The upper seat is provided by the stuffing box. The valve body is formed by two members, one the main body part which has integral therewith the neck portion containing the bearing means and a cover plate removably adapted to a side of the main body portion, the cover plate and the main body portion having mating flat surfaces with a trapped seal therebetween in a recess, such that on removal of the cover plate the whole of the interior of the chamber is exposed to permit machining of the interior of the chamber.

9 Claims, 5 Drawing Sheets

GATE VALVE

This is a continuation of application Ser. No. 231,131 filed Aug. 11, 1988, now abandoned.

The present invention relalates to high pressure, high temperature gate valves, particularly suitable for use in high pressure systems, such as those found in steam boilers oil refineries and oil field steam injection systems.

Heretofore in gate valves the opposite surfaces of the gate of the valve which closes the ports of the valve by seating on a valve seat have been either parallel to each other or to improve the seating pressure of the gate have been wedge-shaped such that the gate in cross-section has a V shape and seats on appropriately shaped valve seats. However, with such a V-shaped gate, immediately on movement of the gate from its closed position towards its open position, fluid under high pressure proceeds to pass around the gate causing turbulence and cavitation in the downstream port of the valve which is undesireable.

The present invention provides a gate valve in which the valve gate is adapted to seat on the valve seat in the closed position with good sealing pressure and in which the movement of fluid under pressure is prohibited until the downstream port starts to open which causes an increase in pressure on the gate forcing it against the smooth surface of the body of the valve and thus reduces cavitation.

According to the present invention therefore there is provided a gate valve comprising a valve body having a bore extending therethrough defining an inlet and an outlet port for the flow or fluid under pressure, a valve gate movable vertically in a valve chamber across said bore between an open position in which said gate is above said bore in said chamber and a closed position in which said gate extends across said bore with its lower end in a part of said chamber recessed into the wall of the bore, said gate having a flat faced downstream wall which in the closed position seats on a flat faced seat surrounding said bore and having a wedge-shaped upstream wall which cooperates with a wedge-shaped wall in said chamber to force said downstream wall onto said flat seat whereby said fluid is only able to pass through said bore when the lower end of said gate is above the lower portion of the wall of said bore thus reducing cavitation. Thus the valve uses a flat gate seating on a flat and preferably interchangable seat, the gate having a wedge-shape on the upstream side which assists in forcing the seating surfaces together which is highly desirable in high pressure conditions. The inlet and outlet ports are completely covered In the closed position which enables the valve to withstand extreme pressures.

In one embodiment of the present invention the seat is removably attached in said chamber around the bore and suitably the seat is a separate part. This exhangable seat facilitates repair and the seat can be made of any number of materials to best resist abrasion and/or corrosive fluids or gases. The valve gate suitably has metal-to-metal seating surfaces and utilizes upstream pressure to assist seating and this pressure is not released until the gate starts to uncover the port and as such wash conditions are minimized.

To facilitate the removal and replacement of the valve seat, a valve body which is suitably cast or forged is formed of at least two body members which are split on a plane normal to the axis of the bore, the body members being secured to each other to define the chamber and the bore, one of the members containing the seat and opening to the exterior of the valve body on an axis normal to the bore, the gate and the valve stem means extending through the chamber and the other body member providing a closure for the one body member.

Further, as the body of the valve is split vertically rather than horizontally with the mass of the value consisting of the body and cover and the additional parts consisting inter alla of the valve stem, hand wheel, gate and seat the chamber of the valve which contains all the moving parts maybe thus completely machined ensuring consistent wall thickness. The elimination of rough cast surfaces in the cavity reduces the tendency for fluids to cavitate and wash out the valve seats and distort the gate. Thus, due to the split nature of the valve body, a machining process can produce a valve chamber to a very fine tolerance which ensures an accurate fit of the valve seat in the valve body and a closer fit between the valve gate and the valve seat. This fine tolerance in the manufacturing process permits interchangability of parts in the valves of the same port diameter. This is in contrast to conventional cast gate valves which are manufactured in a manner which requires a trial and error fit of the valve seat and valve body and a significant increase in the cost of manufacturing that portion of the valve. The valve of the present invention may be manufactured in practically any material that is presently available. Since all the parts are machined the operator of the plant can stock items which will fit many of the valves and eliminate the current need to transport valves from the field, sometimes by air, for repair. The accuracy of the machining process involved in the manufacture of all the parts allows the chamber to serve as a guide for the gate and limit wear and tear on the valve stem. A precise machine fit will result in reduced shear stress on the bolts and contributes to the valve's advantage in high pressure situations. The valve of the present invention may be manufactured from a forging with internal chambers and parts completely machined and therefore can be made from any material that can be forged and indeed can be manufactured from bar stock and therefore any material which can be machined. In a preferred embodiment the other body member providing a closure for said one body member includes a spigot portion allowing a very close fit to resist radial and lineal stresses.

Thus in a further aspect thereof the present invention provides a protruberance which locates into the valve chamber also allows a very close fit to resist radial and lineal stresses.

In a particularly preferred embodiment of the present invention the valve stem means includes a valve stem extending through said chamber and said body having a threaded lower end cooperating with a threaded recess in said gate, said stem being axially rotatable in a bearing menas in said body to raise and lower said gate between said open and closed positions, said bearing means including a stuffing box, a lower seat an upper seat through which said stem extends, said stem inlcuding an integral collar located between said seats, said collar having tapered shoulders which forms a self-aligning seal with said upper and lower seats. The upper seat is provided by the stuffing box which has a flange extending downwardly from the bottom thereof, defining with the valve body a cavity containing the collar with a sealing means trapped in a recess between said flange and said neck portion. The packing or stuffing box of the valve of the present invention suitably utilizes pressure activated packing which is capable of containing high pressure and has an integral collar on the stem and complimentary seats in the body and stuffing box to form back pressure seats in either the open or closed positions such that pressure is only applied to the packing when the gate is travelling form the open to the closed positions or vice versa. Thus, the stuffing box has back seat in both the open and closed position which limits pressure on the packing to periods when the gate is moving between the open and closed positions. The limited pressure on the packing permits it to be changed while the valve is opened or closed without removing the pressure in the valve or removing the valve from the line. The packing rings of the packing are suitably single complete pieces rather than being split, thus the stuffing box is completely isolated from the body cavity when in the extreme open or closed positions.

Thus, the present invention also provides a gate valve comprising a valve body defining an inlet and outlet port for the flow of fluid under pressure therethrough, a valve gate movable vertically in a chamber in said body across said bore between an open position in which said gate is above said bore, allowing communication between said ports and a closed position in which said gate extends across said bore and sealingly seats under pressure with a flat downstream face on a gate seat disposed around said bore on the downstream side of said gate, a valve stem extending through said body into said chamber having a threaded lower end cooperating with a threaded recess in said gate, said stem being axially rotatable in a bearing means in said body to move said gate between said open and closed position, said bearing means including a stuffing box, a lower seat and an upper seat in said body through which said stem extends, said stem including an integral collar located between said upper and lower seats, said collar having tapered shoulders which forms a self-aligning seal with said upper and lower seats, such that when said gate is in its fully closed condition the collar is forced into sealing abutment with said upper seat, and when said gate is in its fully open condition the collar is forced into sealing abutment with the lower seat, whereby in said opened and closed conditions of said gate the stuffing box is completely isolated from fluid pressure from said chamber. The present invention will be further illustrated by way of the accompanying drawing, in which:

Figure 1:
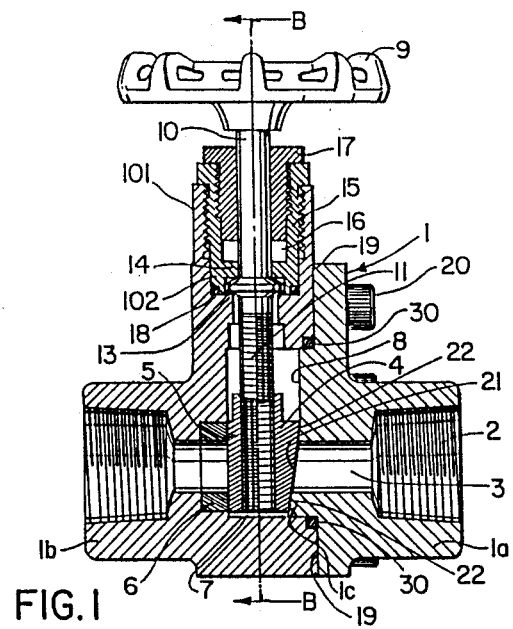
FIG. 1 is a sectional side-view taken along the line A—A in FIG. 2 of a gate valve according to a preferred embodiment of the present invention in the closed condition.
Figure 2:
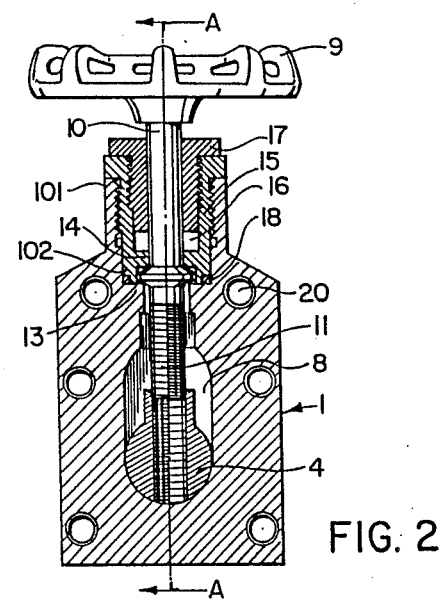
FIG. 2 is a sectional end view-taken along the line B—B in FIG. 1.
Figure 3:
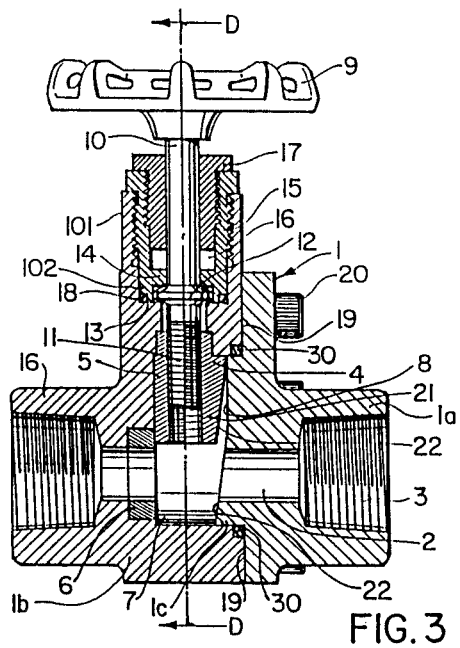
FIG. 3 is a sectional side view taken along line C—C in FIG. 4 of the gate valve of FIG. 1 in the open position.
Figure 4:
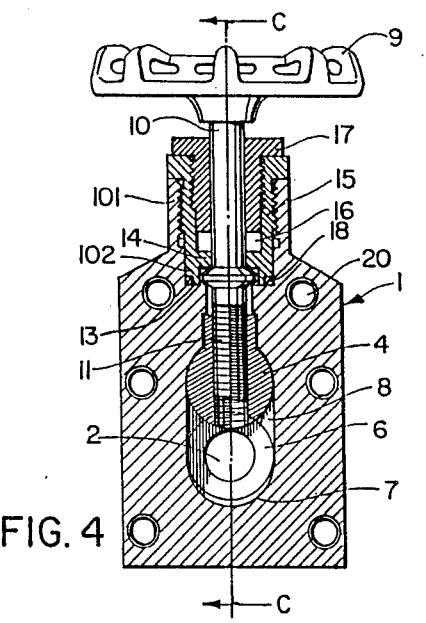
FIG. 4 is a sectional end view taken along line D—D in FIG. 3.

Referring to the accompanying drawings, the gate valve comprises a valve body 1 having a horizontal passage 2 therethrough defining upstream and downstream ports and having threaded ends 3 for connecting to the conduits of a high temperature high pressure system. The ports are opened and closed by a gate 4 having a flat smooth downstream surface 5 seating on a removable valve seat 6 disposed around the passage 2. Thus the seat 6 is a separate part that fits precisely into the machined ledge in the valve body 1, therefore, can be replaced or constructed of any suitable material depending upon the application. The gate 4 in the closed position has its lower end extending into a recess 7 in the wall of the passage 2, which recess 7 forms part of the valve chamber 8 in which the gate moves between its open and closed positions. The upstream face 21 of the valve gate 4 has a wedge-shape which cooperates with a similar surface 22 in the chamber 8 which provides sealing pressure for a tight seal between the downstream face 5 of the valve seat 6 and provides with the recess 7 of the chamber 8 that the ports are completely opened or totally covered when closed which enables it to stand extreme pressures. The movement of the gate 4 between the open and closed position is effected by means of turning a hand wheel 9 mounted on a valve stem 10 having a threaded lower end 11 which turns in a threaded recess in the gate 4, the stem 10 also having a collar 12 disposed in a cavity between a seat 13 formed in a neck portion 101 said body 1 and a seat 14 on a stuffing box body 15 screwed into the neck portion 101 said body 1.

Figure 5:
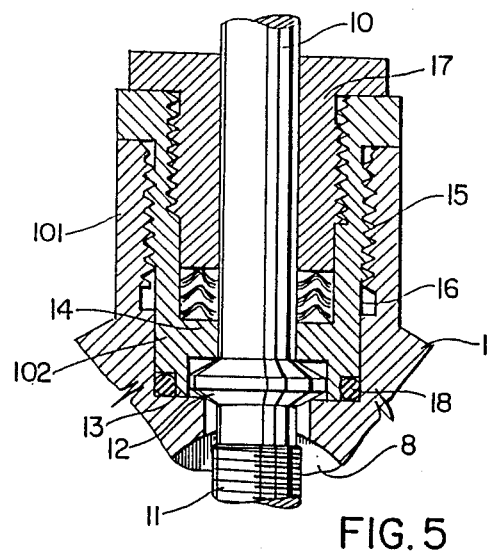
FIG. 5 is an enlarged detail of the bearing of the stem bearing of the gate valve of FIGS. 1 to 5.

Referring particularly to FIG. 5 the stuffing box body 15 contains a Chevron-style packing 16 which is pressure energized and held in by a packing gland 17 screwed into said stuffing box body 15 forming a bearing for the valve stem 10.

The stuffing box body 15 has a downwardly extending flange 102 defining said cavity which is sealed by an O-ring 17 between it and said neck portion 101 of said valve body 1. The collar 12 serves as a thrust bearing but also has tapered shoulders, suitably at about 30° which allow a self-aligning line seal and seat on two-way back seal seats 13 and 14 when the valve gate 4 is in its closed position when the back seal seat 14 is effective and open position when the back seal seat 13 is effective, thereby isolating the the stuffing box from the chamber except when the gate 4 is travelling between the open and closed positions. Thus the stuffing box is completely isolated in such position from the fluid pressure in the valve providing for the capability of changing the packing when required without removing the valve from the line in the open or closed condition and thus providing for simplicity of surface when required.

Referring once more to FIGS. 1 to 4, the valve body 1 has a main body portion 1b which is closed on one side thereof by a removable closure plate 1a having a flat surface mating with a corresponding flat surface on said main body portion, which are clamped together by bolts 20 and trapped sea 30, the main body portion 1b containing all the operational parts including the gate 4 and stem 10 and valve seat 6 and the cover plate 1a has a protuberance 1c which locates in the eccentric valve chamber 8 which allows a very close fit; resists both lineal and radial shear stresses and also traps the seal 30 in all directions. The inner face of the protuberance 1c thus constitutes the wall 22 of the chamber 8.

Thus, the gate valve of the present invention has valve ports which are completely open or totally covered when closed, has body parts which may be made of a material best suited to resit corrosive fluids or gases and are not just coated, will allow for the containment of high pressure high high temperature fluids or gases, provides for the stuffing box to be completely isolated from the body chamber except when the gate is travelling through the opposite open or closed condition, provides for interchangable seats of material best suited for service conditioning of the valve, allows for the body and cover to be machined from forging and thus from superior material, allows for changing of the packing, allows for close machining tolerance of all parts to allow the gate chamber to also be a guide for the gate and provides for close tolerances which ensure complete interchange of all parts, i.e., all seats will fit any seat chamber. Further all body cavity and matching cover parts may be completely machined for fit to contain a gasket seal and to reduce shear stresses on bolting.

The embodiments of the invention in which an exclusive property or privilege is claimed are defined as follows:

1. A gate valve of the type suitable for use in high pressure steam systems and the like, comprising:
    (a) a valve body having a main body portion containing a valve chamber completely open on one side wall of the valve body such that the whole of the valve chamber is exposed and accessible for maching thereof, and a neck portion containing a closed stem chamber completely surrounded by an integral, unbroken chamber wall, said open side wall being machined to provide a flat mating surface surrounding said open valve chamber;
    (b) said main body portion having inlet and outlet ports for high-pressure fluid and a transverse passage extending therebetween;
    (c) a valve gate member guided vertically in said valve chamber and movable between an open position, in which said gate member is above said transverse passage, and a closed position, in which said gate member obstructs said passage to prevent fluid flow therethrough;
    (d) said valve gate member having a smooth flat-faced downstream wall, which in the closed position seats on a flat-faced seat surrounding said passage, and having a wedge-shaped upstream wall, which cooperates with a wedge-shaped wall in said chamber to force the downstream wall sealingly onto the flat-faced seat;
    (e) a valve stem guided in said neck portion through said stem chamber and surrounded by said integral wall thereof, said valve stem extending into said valve chamber, said valve stem having a threaded lower end cooperating with a threaded recess in said gate member, and said stem being rotatable in a bearing means in said neck portion to raise and lowe said gate member between said open and closed positions;
    (f) said open side of said main body portion being closed by a removable closure plate having a flat surface mating with the corresponding flat surface on said main body portion;
    (g) clamping means for clamping said closure plate firmly to said main body portion;
    (h) said closure plate further having a smooth protuberance on an inner surface thereof, which is slidable into the open side of the valve chamber so as to partially penetrate said valve chamber and become snugly located therein;
    (i) said mating flat surfaces of said closure plate and said main body portion enclosing a recess surrounding the valve chamber for accommodating sealing means; and
    (j) sealing means trapped in said (a) recess surrounding the valve chamber under the action of said clamping means to prevent leakage of high pressure fluid from said valve chamber;
    whereby said closure member can be removed to expose the whole of the interior of said valve chamber to permit machining thereof, and clamped in position on said main body portion to permit operation in high pressure steam systems and the like without compromising valve integrity.

2. A gate valve as claimed in claim 1, in which said recess surrounding the valve chamber is formed in said one side wall at an edge thereof bounding the valve chamber and is bounded on the inside by a side wall of said protuberance when it is snugly locaed in the valve chamber.

3. A gate valve as claimed in claim 2, in which the cover plate includes one of said inlet and outlet ports.

4. A gate valve as claimed in claim 3, in which said protuberance forms the wedge-shaped wall of said chamber.

5. A gate valve as claimed in claim 4, in which said flatfaced seat is an insert removably attached to said valve chamber to surround said passage.

6. A gate valve as claimed in claim 4, in which said clamping means comprise bolts extending through said closure plate and wing portions of said one side wall.

7. A gate valve as claimed in claim 1, wherein said bearing means includes a stuffing box through which said valve stem extends and having a packing therein; a flange downwardly extending from said stuffing box defining with the neck portion a cavity sealing means trapped in a recess, said flange and said neck portion; said stem including an integral collar located in said cavity between an upper seat provided by said stuffing box and a lower seat provided by said neck portion; said collar having tapered shoulders which form self-aligning seals with said upper and lower seats; whereby said collar backseats on said upper and lower seats in the fully closed and fully opened positions of said valve gate member to isolate said stuffing box from said fluid high pressure to allow said packing to be replaced both in the fully opened and fully closed positions of said valve gate member.

8. A gate valve as claimed in claim 1, wherein said bearing means includes stuffing box means through which said valve stem extends and having packing therein; a flange downwardly extending from said stuffing box means defining with the neck portion a cavity, said flange being in sealing abutment with said neck portin; said stem inlcuding an integral collar located in said cavity between an upper seat provided by said stuffing box means and a lower seat provided by said neck portion; said collar having tapered shoulders which form self-aligning seals with said upper and lower seats in the fully closed and fully opened positions of said valve gate member to isolate said stuffing box means from said fluid high-pressure to allow said packing to be replaced both in the fully opened and fully closed positions of said valve gate member.

9. A gate valve of type suitable for use in high presure steam systems and the like, comprising:
    (a) a valve body having a main body portion containing a valve chamber completely open on one side wall of the valve body such that the whole of the valve chamber is exposed and accessible for machining thereof, and a neck portion containing a closed stem chamber completely surrounded by an integral, unbroken chamber wall, said open side wall being machined to provide a flat mating surface surrounding said open valve chamber;

(b) said main body portion having inlet and outlet ports for high-pressure fluid and a transverse passage extending therebetween;

(c) a valve gate member guided vertically in said valve chamber and movable between an open position, in which said gate member is above said transverse passage, and a closed position, in which said gate member obstructs said passage to prevent fluid flow therethrough;

(d) a valve stem guided in said neck portion through said stem chamber and surrounded by said integral wall thereof, said valve stem extending into said valve chamber, said valve stem having a threaded lower end cooperating with a threaded recess in said gate member, and said stem being rotatable in a bearing means in said neck portion to raise and lower said gate member between said open and closed positions;

(e) said one side of said main body portion being closed by a removable closure plate having a flat surface mating with the corresponding flat surface on said main body portion;

(f) clamping means for clamping said closure plate firmly to said main body portion;

(g) said closure plate further having a smooth protuberance on an inner surface thereof, which is slidable into the open side of the valve chamber so as to partially penetrate said valve chamber and become snugly located therein;

(h) said mating flat surfaces of said closure plate and said main body portion enclosing a recess surrounding the valve chamber for accommodating sealing means; and (i) sealing means trapped in said recess surrounding the valve chamber under the action of said clamping means to prevent leakage of high pressure fluid from said valve chamber;

whereby said closure member can be removed to expose the whole of the interior of said valve chamber to permit machining thereof, and clamped in position on said main body portion to permit operation in high pressure steam systems and the like without comprising valve integrity.

* * * * *

UNITED STATES PATENT AND TRADEMARK OFFICE
CERTIFICATE OF CORRECTION

PATENT NO. : 4,944,488
DATED : July 31, 1990
INVENTOR(S) : Clayson

It is certified that error appears in the above-identified patent and that said Letters Patent is hereby corrected as shown below:

ON TITLE PAGE: of the patent, the Assignee should read as follows:

--345001 Alberta Ltd., Canada--.

Signed and Sealed this

Twenty-fifth Day of February, 1992

Attest:

HARRY F. MANBECK, JR.

*Attesting Officer*　　　　*Commissioner of Patents and Trademarks*